US008918567B2

(12) United States Patent
Chiu et al.

(10) Patent No.: US 8,918,567 B2
(45) Date of Patent: Dec. 23, 2014

(54) CONNECTION DEVICE CAPABLE OF INCREASING DATA READING AND WRITING SPEEDS

(71) Applicant: WareMax Electronics Corp., Taipei (TW)

(72) Inventors: Yu-Ting Chiu, Taipei (TW); Chih-Liang Yen, Taipei (TW); Cheng-Wei Yang, Taipei (TW)

(73) Assignee: WareMax Electronics Corp., Taipei (TW)

( * ) Notice: Subject to any disclaimer, the term of this patent is extended or adjusted under 35 U.S.C. 154(b) by 0 days.

(21) Appl. No.: 13/742,565

(22) Filed: Jan. 16, 2013

(65) Prior Publication Data
US 2013/0212307 A1     Aug. 15, 2013

(30) Foreign Application Priority Data

Feb. 15, 2012  (TW) .............................. 101202729 U

(51) Int. Cl.
G06F 13/12    (2006.01)
G06F 13/38    (2006.01)
G06F 3/06     (2006.01)
G06F 12/08    (2006.01)
G06F 12/10    (2006.01)

(52) U.S. Cl.
CPC .......... G06F 3/0613 (2013.01); G06F 12/0873 (2013.01); G06F 3/0631 (2013.01); G06F 3/0685 (2013.01); G06F 12/1018 (2013.01)
USPC .......................................... 710/74

(58) Field of Classification Search
CPC .............. G06F 13/4072; G06F 13/409; G06F 13/4226; G06F 13/105; G06F 13/102; G06F 13/122; G06F 13/387; G06F 13/4022
USPC .......................................................... 710/74
See application file for complete search history.

(56) References Cited

U.S. PATENT DOCUMENTS 6,865,648 B1 *   3/2005  Naamad et al. ................ 711/133
2011/0231624 A1 * 9/2011  Fukutomi et al. ............. 711/162
2013/0179597 A1 * 7/2013  Amit et al. ........................ 710/5

* cited by examiner

Primary Examiner — Idriss N Alrobaye
Assistant Examiner — Brooke Taylor
(74) Attorney, Agent, or Firm — Bacon & Thomas, PLLC

(57) ABSTRACT

The present invention is to provide a connection device capable of increasing data reading and writing speeds, wherein the connection device includes a first connection module connected to a computer, a second connection module connected to at least one regular storage unit, a high-speed storage unit having higher data reading and writing speeds than each regular storage unit, and a control module respectively connected to the connection modules and the high-speed storage unit for identifying product information of each regular storage unit and the high-speed storage unit and generating a forward mapping table for each regular storage unit and a backward mapping table for the high-speed storage unit. Thus, when the computer performs a reading or writing operation on the regular storage unit, the control module can execute the operation through the high-speed storage unit according to the mapping tables, so as to shorten the time required for data processing.

13 Claims, 13 Drawing Sheets

CONNECTION DEVICE CAPABLE OF INCREASING DATA READING AND WRITING SPEEDS

FIELD OF THE INVENTION

The present invention relates to a connection device for increasing data reading and writing speeds, more particularly to a connection device including a control module and a high-speed storage unit and connected between a computer and at least one regular storage unit, so as to enable the control module to execute a reading or writing operation through the high-speed storage unit, when the computer performs the same operation on the regular storage unit, for shortening the time required for data processing.

BACKGROUND OF THE INVENTION

Computers are now an indispensible tool in our daily lives. With the rapid development of electronic technology, computer components (e.g., CPUs, memories, hard disk drives, etc.) are constantly improved in order to provide more powerful functions and be available at lower prices. Such revolutionary advances, however, may cause inconvenience in use. Take the hard disk drive required in every computer for example. A traditional hard disk drive is typically connected to a computer via an Integrated Device Electronics (IDE) interface. The IDE interface advantageously features a low price and high compatibility but has strict limitations on the length of interface cables. Moreover, the IDE interface is highly subject to interference from noises generated by other lines (e.g., power cables, audio cables, etc.). Therefore, ever since the advent of the Serial Advanced Technology Attachment (SATA) interface, which has a higher transfer speed, greater error correction ability, and simpler structure than IDE and is hot-swappable, the IDE interface has been replaced by the SATA interface as the connection interface of newly developed computers. But here comes the problem. One who buys a new computer is very likely to find the old hard disk drives, which are configured for the IDE interface, uninstallable in the new computer; as a result, the data in the old hard disk drives cannot be read.

To solve the problem, the IDE/SATA adapter was designed which has a connection port for the IDE interface, a connection port for the SATA interface, and an adapter circuit. An IDE/SATA adapter can be respectively connected to the SATA interface of a computer and the IDE interface of a hard disk drive so that, by the simple adapter circuit, the computer is enabled to read the data stored in the hard disk drive. While the IDE/SATA adapter provides a convenient solution to the problem that an IDE hard disk drive cannot be accessed by a computer with the SATA interface, the IDE/SATA adapter is no more than an adapter and does not contribute to increasing the speed at which the computer can read data from the hard disk drive. Even worse, as an IDE/SATA adapter has to convert between different interfaces, the read speed of a computer connected with such an adapter will be lower than expected. From a user's point of view, therefore, an IDE/SATA adapter is only good for addressing the urgent need for IDE/SATA conversion but does not provide stable and rapid data processing; in short, the existing IDE/SATA adapters leave much room for improvement. Furthermore, apart from IDE and SATA, common interfaces nowadays include Universal Serial Bus (USB), Small Computer System Interface (SCSI), Thunderbolt (codenamed Light Peak), and IEEE 1394 (also known as FireWire). Obviously, the existing IDE/SATA adapters cannot solve the problems associated with conversion between all these interfaces.

In an earlier effort to increase the read and write speeds of hard disk drives, the inventor of the present invention developed a "System and Method for Increasing Read and Write Speeds of Hybrid Storage Device". The method is briefly described as follows. A control module automatically detects the product information (e.g., capacity, specifications, etc.) of a regular storage unit (e.g., a hard disk drive, a disk array, etc.) and of a high-speed storage unit (e.g., a solid-state drive, a cache memory, etc.) and generates a forward mapping table for the regular storage unit and a backward mapping table for the high-speed storage unit, wherein each table includes a plurality of fields. The control module can write a tag into each field such that the fields of the forward mapping table correspond to the fields of the backward mapping table respectively. When a computer is to read data from or write data into the regular storage unit, the control module finds the corresponding high-speed storage sections of the high-speed storage unit according to the mapping tables and performs the reading or writing operation preferentially on the high-speed storage sections. Thus, the time required for data processing can be substantially reduced, thanks to the higher read and write speeds of the high-speed storage unit.

The inventor believes that the conventional IDE/SATA adapters can be further improved by incorporating the "System and Method for Increasing Read and Write Speeds of Hybrid Storage Device", and that the improved adapter should be a connection device capable of enabling fast data reading and writing so as to effectively overcome the drawbacks of the existing IDE/SATA adapters. Hence, the issue to be addressed by the present invention is to design a novel connection device by applying the aforesaid method to the conventional IDE/SATA adapters.

BRIEF SUMMARY OF THE INVENTION

In view of the fact that the conventional IDE/SATA adapters are not configured for accelerating data access, the inventor of the present invention conducted extensive research and experiment based on his ample experience in research and development in the related fields and finally succeeded in developing a connection device which can increase data reading and writing speeds and thereby enhance the convenience of use of external hard disk drives.

It is an object of the present invention to provide a connection device capable of increasing data reading and writing speeds, wherein the connection device includes a first connection module, a second connection module, a high-speed storage unit, and a control module. The first connection module (e.g., a wireless transmission unit or a connection port supporting the USB, eSATA, Thunderbolt, or like interface) is connected to a computer in a wireless or wired manner in order to transmit data to and from the computer. The second connection module (e.g., a wireless transmission unit or a connection portion supporting the USB, eSATA, Thunderbolt, or like interface) is connected to at least one regular storage unit in a wireless or wired manner in order to transmit data to and from each regular storage unit. Each regular storage unit has a plurality of regular storage sections. The high-speed storage unit has a higher data reading speed and a higher data writing speed than each regular storage unit and has a plurality of high-speed storage sections. The control module is respectively and electrically connected to the first connection module, the second connection module, and the high-speed storage unit. The control module can identify the product information (e.g., capacity, specifications, or type) of each regular storage unit and of the high-speed storage unit and generate a forward mapping table for each regular storage unit and a backward mapping table for the high-speed storage unit. The forward mapping table has a plurality of forward fields each corresponding to one regular storage section. The backward mapping table has a plurality of backward fields each corresponding to one high-speed storage section. The control module can write a forward tag into each forward field such that each forward field further corresponds to one backward field. Or, the control module can write a backward tag into each backward field such that each backward field further corresponds to one forward field. When the computer is to perform a reading or writing operation on certain regular storage sections, the control module finds the corresponding high-speed storage sections according to the mapping tables, before writing the data into the corresponding high-speed storage sections or reading the data in the corresponding high-speed storage sections. Thus, the higher data reading and writing speeds of the high-speed storage unit help shorten the time required for data processing.

Another object of the present invention is to provide the foregoing connection device, wherein the second connection module is provided with a first switch. When there are a plurality of regular storage units, the first switch can provide electrical connection with any of the regular storage units so that, by controlling the first switch, a user can enable the connection device to process data to or from a specific regular storage unit rapidly.

Still another object of the present invention is to provide the foregoing connection device, wherein the second connection module is provided with a plurality of second switches. The second switches can provide electrical connection with the at least one regular storage unit respectively so that, by controlling the connection and disconnection between each second switch and the corresponding regular storage unit, a user can choose the number of the regular storage unit(s) that the connection device is to access simultaneously.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
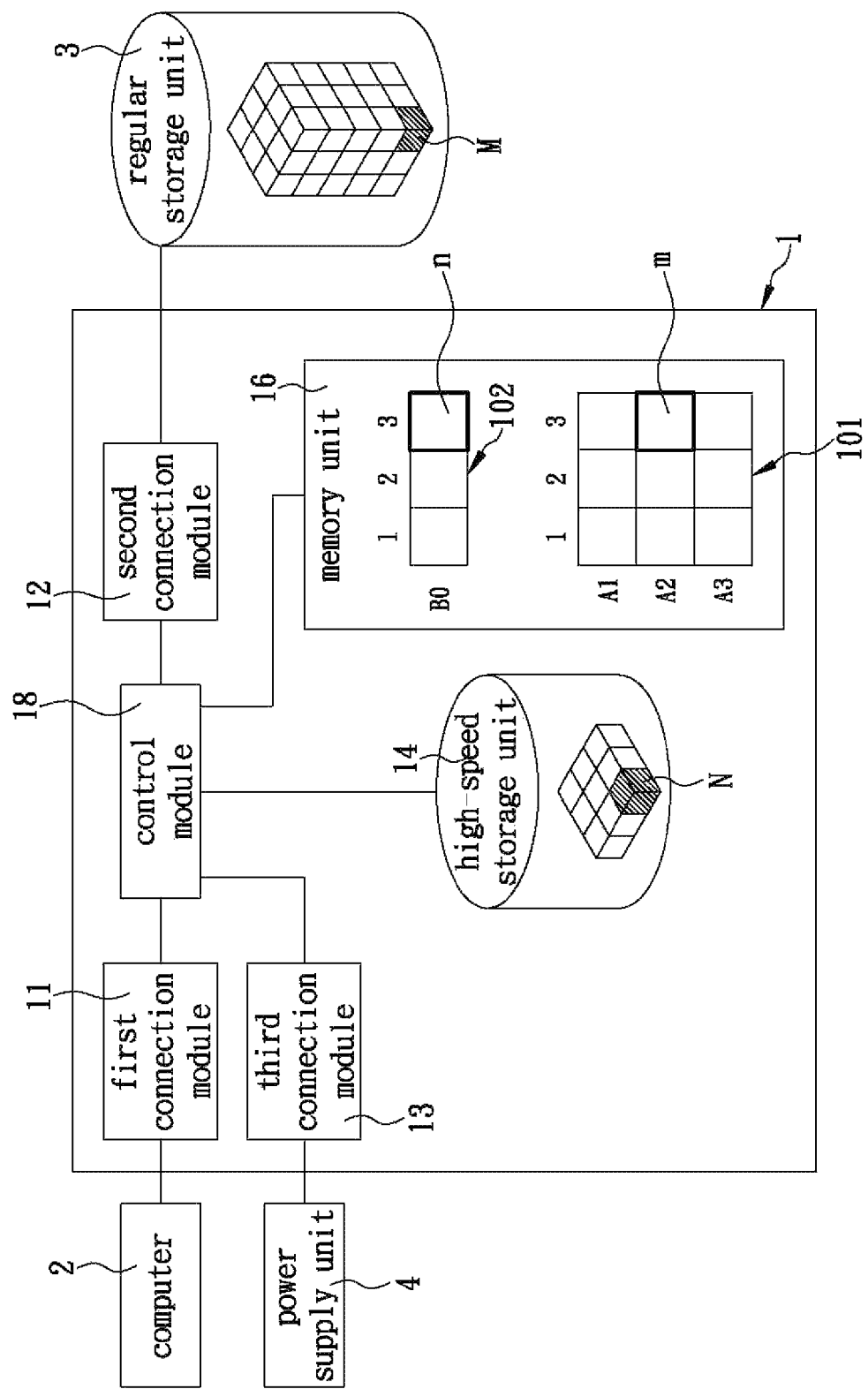
FIG. 1 is a schematic drawing of the first preferred embodiment of the connection device of the present invention.

The present invention discloses a connection device capable of increasing data reading and writing speeds. Referring to FIG. 1 for the first preferred embodiment of the present invention, the connection device 1 includes a first connection module 11, a second connection module 12, a high-speed storage unit 14, a memory unit 16, and a control module 18. The first connection module 11 can be connected to a computer 2 to enable data transmission between the connection device 1 and the computer 2. The second connection module 12 can be connected to at least one regular storage unit 3 to enable data transmission between the connection device 1 and the at least one regular storage unit 3. In this embodiment, each of the connection modules 11, 12 is a connection port supporting the IDE, SATA, SCSI, USB, Thunderbolt, or like interface.

As shown in FIG. 1, the regular storage unit 3 has a plurality of regular storage sections M, and the high-speed storage unit 14 has a plurality of high-speed storage sections N. The regular storage unit 3 and the high-speed storage unit 14 are storage devices of different types (e.g., a hard disk drive, a solid-state drive, a disk array, a flash memory module, an SDRAM memory module (DDR/DDR2/DDR3/DDR4, etc.), a Magnetoresistive Random Access Memory (MRAM) memory module, etc.), wherein the high-speed storage unit 14 has a higher read speed and a higher write speed than the regular storage unit 3 (e.g., the regular storage unit 3 being a hard disk drive, and the high-speed storage unit 14, a solid-state drive; or the regular storage unit 3 being a disk array, and the high-speed storage unit 14, an SDRAM memory module; or the regular storage unit 3 being a hard disk drive, and the high-speed storage unit 14, a flash memory module; or the regular storage unit 3 being a solid-state drive, and the high-speed storage unit 14, an SDRAM memory module; or the regular storage unit 3 being a disk array, and the high-speed storage unit 14, an MRAM memory module).

Referring to FIG. 1, the control module 18 is respectively and electrically connected to the first connection module 11, the second connection module 12, the high-speed storage unit 14, and the memory unit 16. The control module 18 can identify the product information (e.g., capacity, specifications, etc.) of the regular storage unit 3 and of the high-speed storage unit 14 and generate a forward mapping table 101 for the regular storage unit 3 and a backward mapping table 102 for the high-speed storage unit 14. The mapping tables 101, 102 are stored in the memory unit 16. The forward mapping table 101 has a plurality of forward fields m, and each forward field m corresponds to one regular storage section M. The backward mapping table 102 has a plurality of backward fields n, and each backward field n corresponds to one high-speed storage section N. In this embodiment, the forward mapping table 101 and the backward mapping table 102 are each vertically and horizontally labeled with a plurality of sequential reference codes (i.e., A1, A2, B0, 1, 2, 3, etc.). This allows each forward field m and each backward field n to be identified by the corresponding reference codes. For instance, in FIG. 1, the forward field m surrounded by a thick black frame corresponds to the reference codes A2 and 3 and can therefore be identified by A23. Likewise, the backward field n surrounded by a thick black frame corresponds to the reference codes B0 and 3 and can be identified by B03.

It should be pointed out that, while the forward mapping table 101 and the backward mapping table 102 in this embodiment are stored in the memory unit 16, it is feasible for the control module 18 in another embodiment of the present invention to generate the mapping tables 101, 102 and store them into the high-speed storage unit 14 or the regular storage unit 3 instead of the memory unit 16.

Referring to FIG. 1, the control module 18 can write a forward tag into each forward field m, making each forward field m correspond to one backward field n (e.g., by writing B03 into a certain forward field m, the forward field m is made correspond to the backward field n surrounded by a thick black frame in FIG. 1) or write a backward tag into each backward field n, making each backward field n correspond to one forward field m (e.g., by writing A23 into a certain backward field n, the backward field n is made correspond to the forward field m surrounded by a thick black frame in FIG. 1). If, after the connection device 1 is connected to the computer 2 and the regular storage unit 3, the computer 2 is to read data from or write data into a specific regular storage section M of the regular storage unit 3, the control module 18 will find the forward field m corresponding to the regular storage section M according to the forward mapping table 101 and then, based on the forward tag in the forward field m, find the corresponding backward field n and high-speed storage section N, so as to write the to-be-written data into the high-speed storage section N or read the data stored therein. Thus, the time required for data processing can be reduced by virtue of the higher data reading and writing speeds of the high-speed storage unit 14.

Figure 2A:
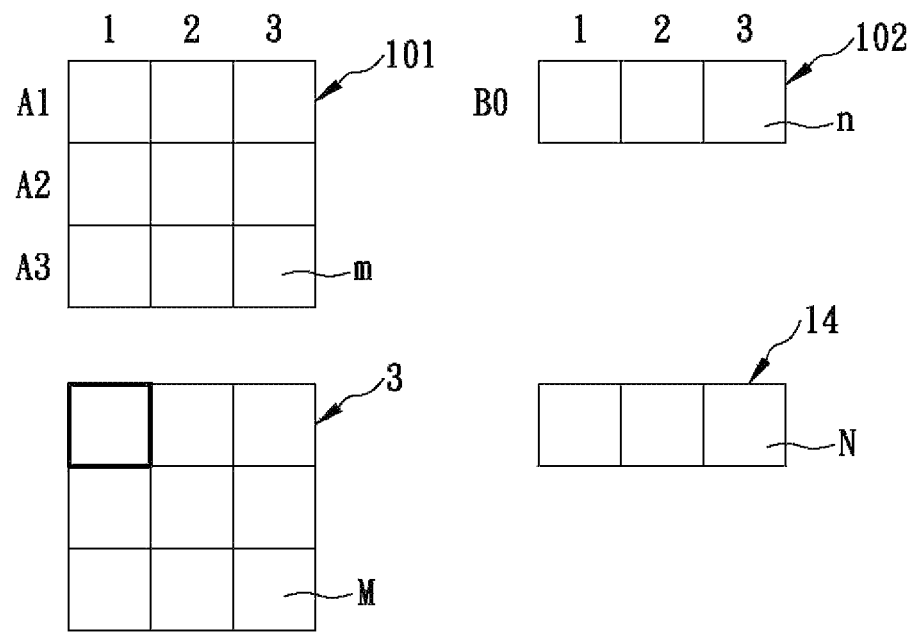
FIGS. 2A~2C show consecutive steps performed by the first preferred embodiment of the connection device of the present invention.
Figure 2B:
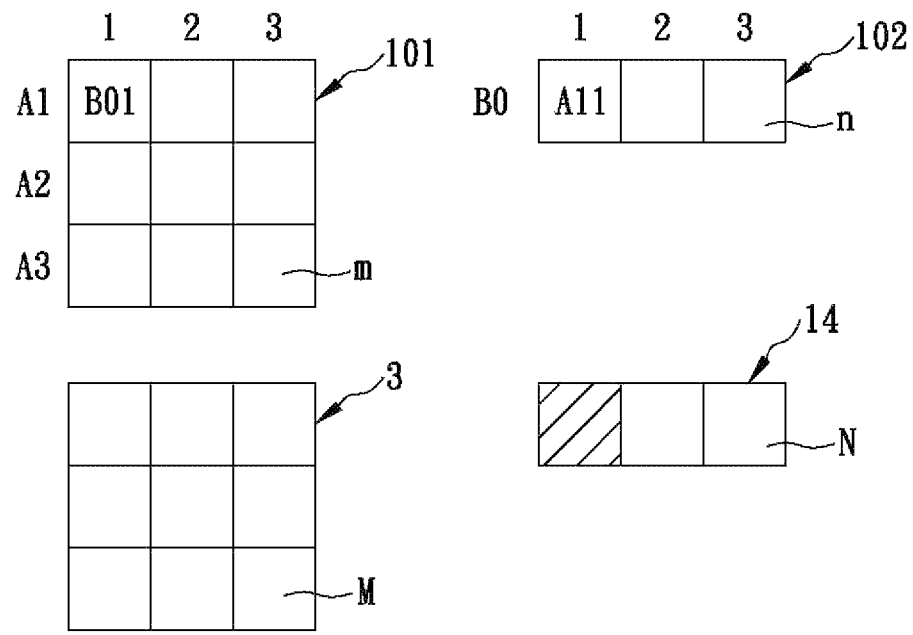
Figure 2C:
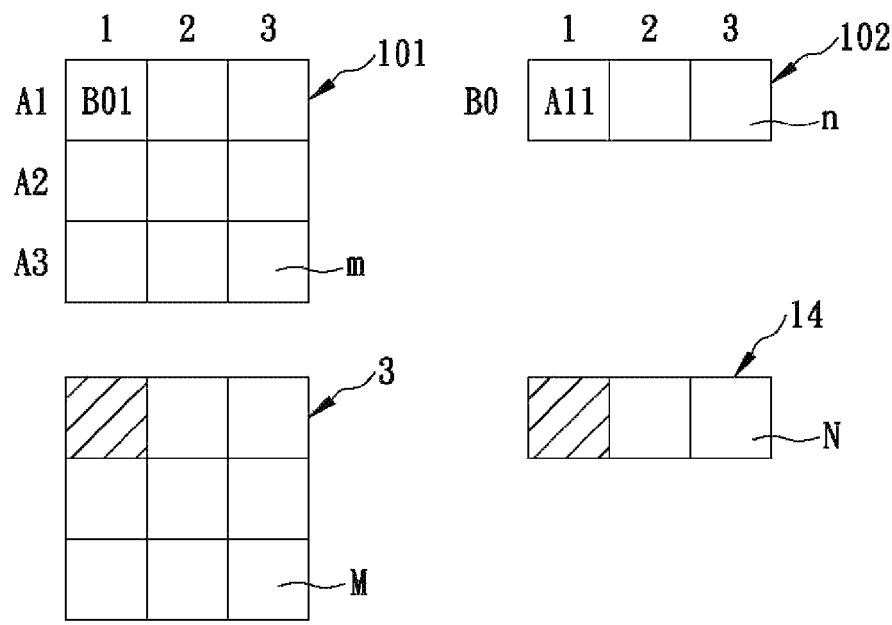

To clearly demonstrate the operation of the control module while the connection device is in use, the process performed with respect to the mapping tables 101, 102 is now described in a step-by-step manner with reference to FIGS. 2A~2C. FIG. 2A shows the conditions of the mapping tables 101, 102 when the computer 2 is about to write data into a specific regular storage section M. On the left of FIG. 2A are the forward mapping table 101 and the corresponding regular storage unit 3, while on the right of FIG. 2A are the backward mapping table 102 and the corresponding high-speed storage unit 14. The regular storage section M into which the computer 2 is to write data is indicated by a thick black frame. As the forward field m corresponding to this regular storage section M (i.e., the forward field m corresponding to the reference codes A1 and 1) does not have a forward tag written therein, the control module 18 writes the data into an arbitrary unused high-speed storage section N of the high-speed storage unit 14.

Referring to FIG. 2B, once the data are written into a high-speed storage section N (which in this case corresponds to the backward field n corresponding to the reference codes B0 and 1), the control module 18 updates the mapping tables 101, 102 by filling the forward field m corresponding to the intended regular storage section M with the corresponding forward tag (i.e., B01) and filling the backward field n corresponding to the high-speed storage section N with the corresponding backward tag (i.e., A11). Then, referring to FIGS. 1 and 2C, under the condition that the computer 2 does not issue a further writing or reading command to the connection device 1, the control module 18 takes advantage of this idle time to update the intended regular storage section M with the data in the high-speed storage section N. Thus, the data are written into the regular storage section M intended by the computer 2.

Figure 3A:
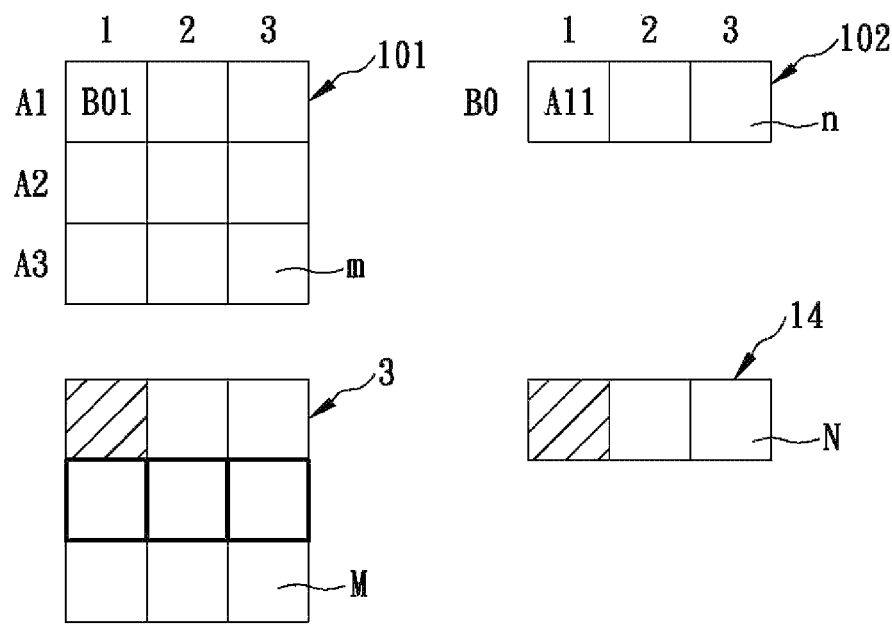
FIGS. 3A~3E show consecutive steps performed by the first preferred embodiment of the connection device of the present invention.
Figure 3B:
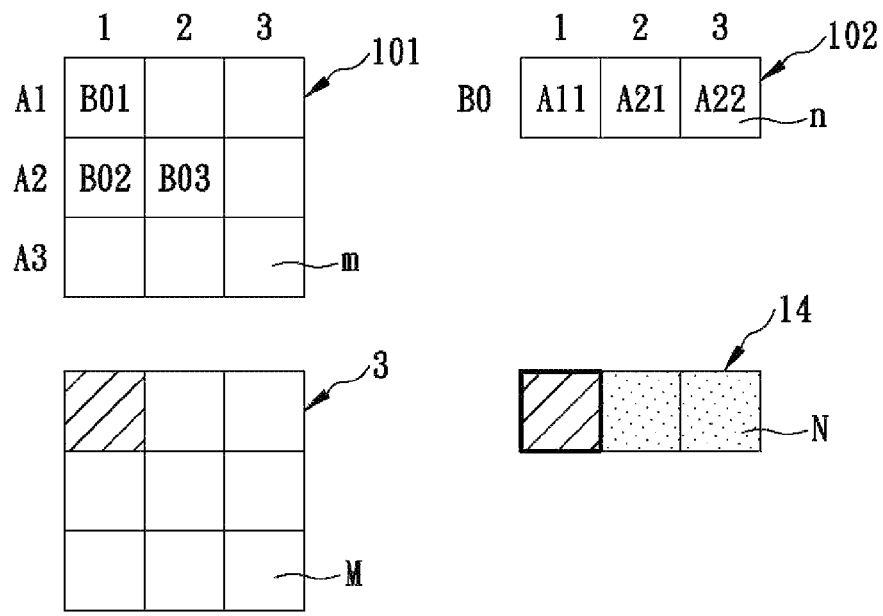
Figure 3C:
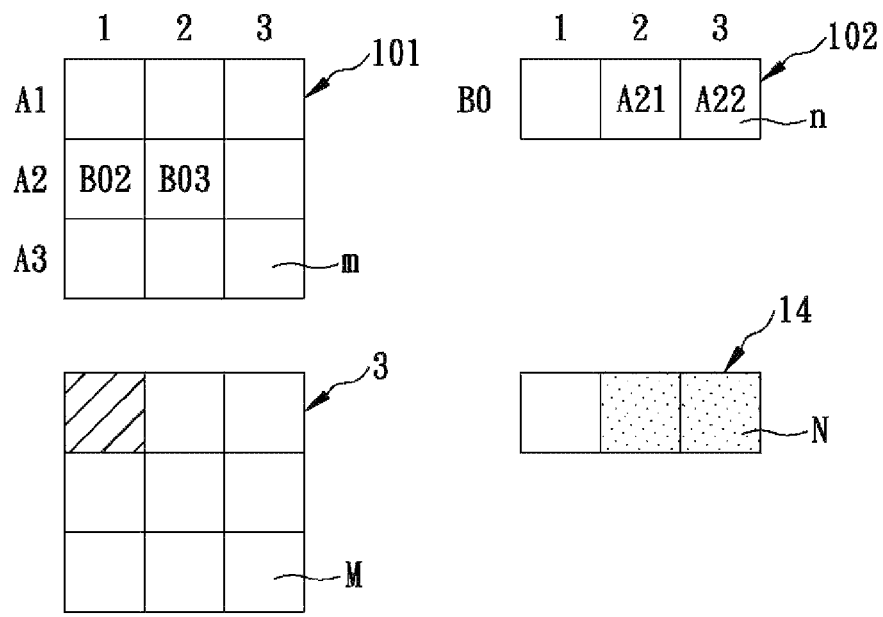
Figure 3D:
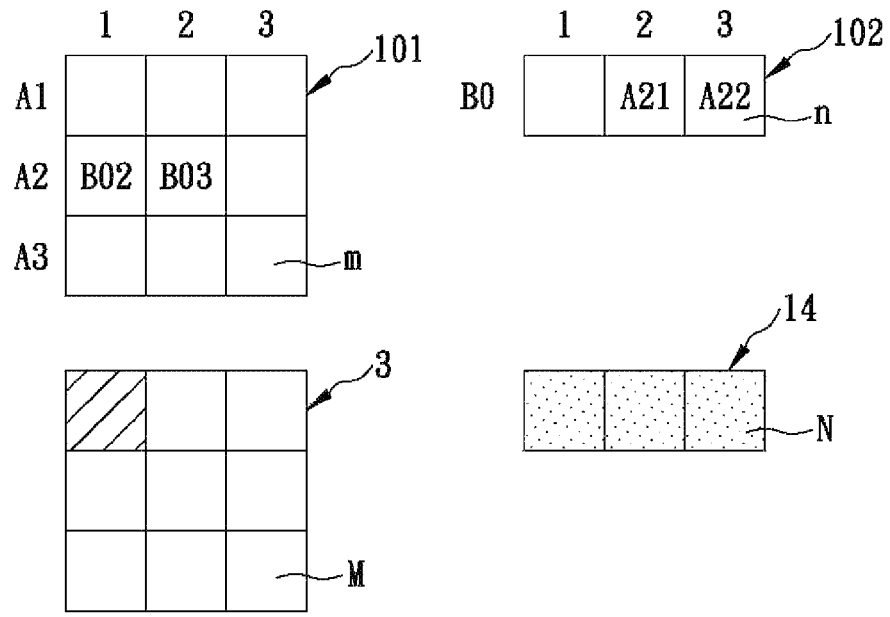
Figure 3E:
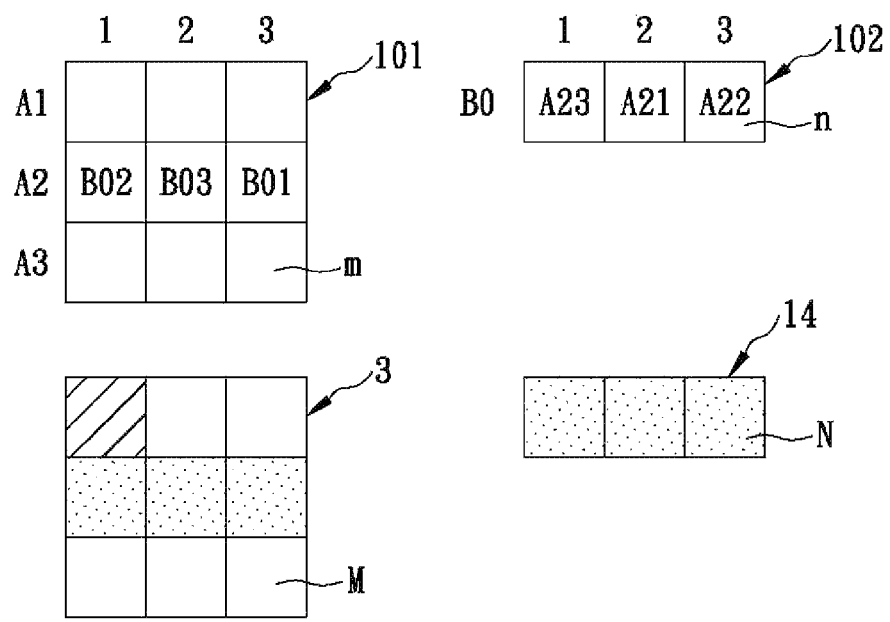

Next, referring to FIGS. 1 and 3A, the computer 2 is about to write plural entries of data (hereinafter referred to as the second data) into three regular storage sections M (each indicated by a thick black frame in FIG. 3A) respectively. Since none of the forward fields m corresponding to the three regular storage sections M has a forward tag written therein, the control module 18 writes a portion of the second data into the unused high-speed storage sections N of the high-speed storage unit 14 first, as shown in FIG. 3B, and the storage capacity of the high-speed storage unit 14 is thus used up. The control module 18 then performs a relocation process in response. To begin with, the control module 18 determines whether the data stored in the other high-speed storage section N of the high-speed storage unit 14 (e.g., the high-speed storage section N with a thick black frame in FIG. 3B) match the data in the corresponding regular storage section M. As the data in the regular storage section M corresponding to the high-speed storage section N with the thick black frame in FIG. 3B have been updated in the step shown in FIG. 2C, the control module 18 simply deletes the data in this high-speed storage section N and updates the tags in the mapping tables 101, 102, thereby completing the relocation process. A used high-speed storage section N is thus freed, as shown in FIG. 3C. After that, referring to FIG. 3D, the control module 18 writes the remaining entry of the second data into the empty high-speed storage section N. Last but not least, referring to FIG. 3E, the control module 18 once again updates the tags in the mapping tables 101, 102 and the data in the regular storage sections M such that the second data are stored in the regular storage sections M intended by the computer 2.

Figure 4A:
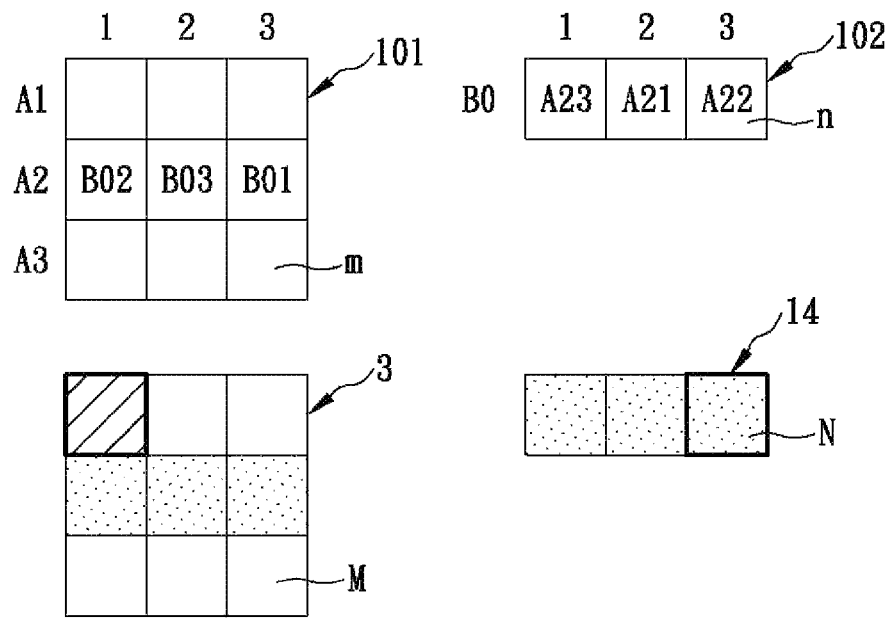
FIGS. 4A~4C show consecutive steps performed by the first preferred embodiment of the connection device of the present invention.
Figure 4B:
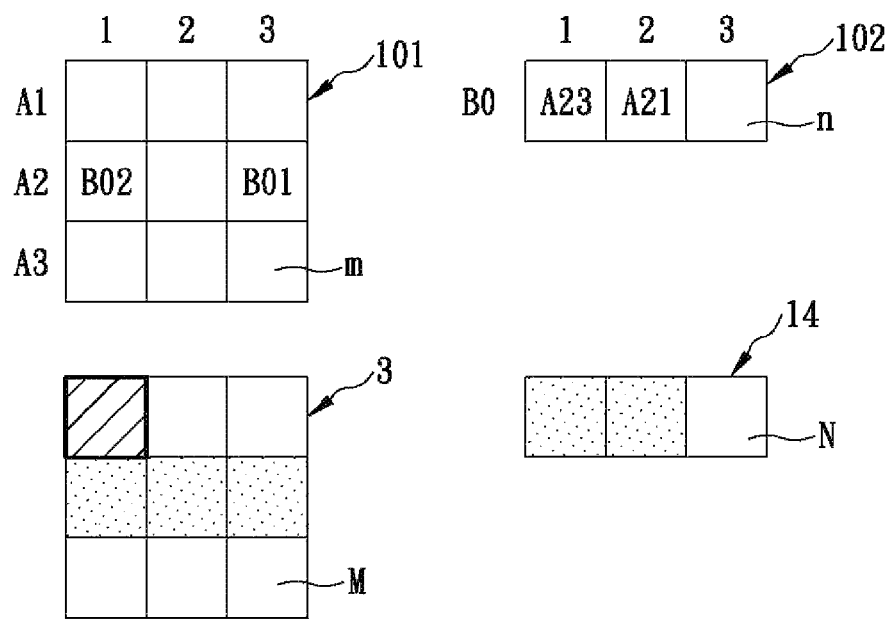
Figure 4C:
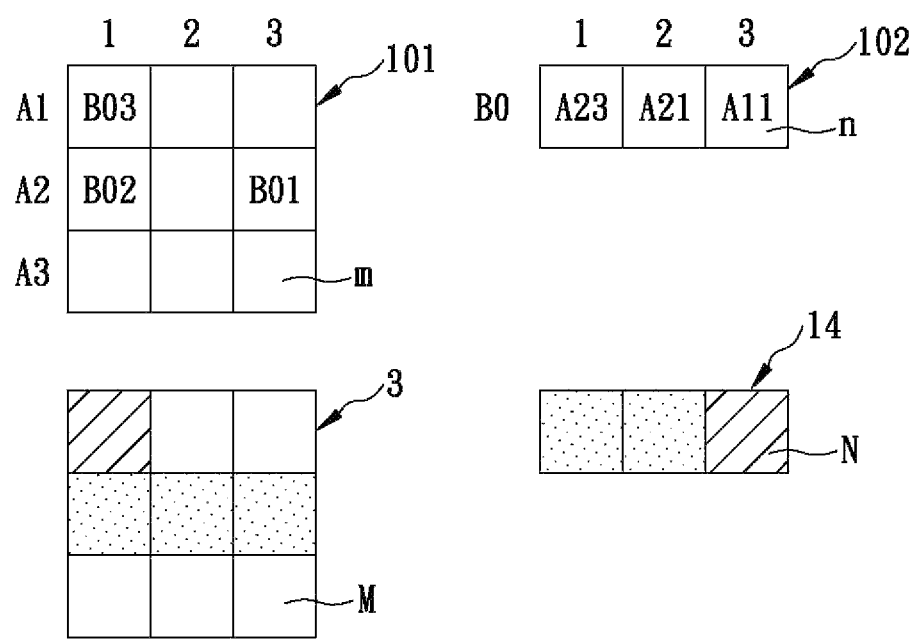

Referring to FIGS. 1 and 4A, the computer 2 is about to read the data in a specific regular storage section M (i.e., the regular storage section M of the regular storage unit 3 in FIG. 4A that is indicated by a thick black frame), but the forward field m corresponding to this regular storage section M does not have any forward tag written therein, meaning the high-speed storage unit 14 does not have a corresponding high-speed storage section N. Therefore, the control module 18 performs the relocation process first, with a view to relocating the data in a high-speed storage section N (i.e., the high-speed storage section N of the high-speed storage unit 14 in FIG. 4A that is indicated by a thick black frame) to the regular storage unit 3. Referring to FIG. 4B, the control module 18 finds the corresponding regular storage section M according to the backward tag written in the backward field n corresponding to the high-speed storage section N with the thick black frame in FIG. 4A and, after confirming that the data in the regular storage section M match the data in the high-speed storage section N, empties the high-speed storage section N. Referring to FIG. 4C, once the control module 18 confirms that the data in the high-speed storage section N have been updated to the regular storage section M, the control module 18 transmits the data in the intended regular storage section M to the computer 2 and the just emptied high-speed storage section N at the same time. Thus, when the computer 2 needs to read the data in that particular regular storage section M again, the control module 18 can read the same data directly from the high-speed storage section N. As the connection device will, in all circumstances, perform the intended reading or writing operation on the high-speed storage unit 14 first and update and confirm the data in the regular storage unit 3 when idle, the reading or writing operation intended by the computer will be completed with increased efficiency.

Referring back to FIG. 1, the connection device 1 further includes a third connection module 13. The third connection module 13 has one end electrically connected to the control module 18 and the other end connectable to an external power supply unit 4. Thus, the power supply unit 4 can supply power to the control module 18 via the third connection module 13. Besides, as previously stated, the first connection module 11 and the second connection module 12 are connection ports supporting the IDE, SATA, SCSI, USB, or Thunderbolt interface specifications. As the specifications of the connection ports vary, the configuration of the connection device 1 will change accordingly. Please refer to FIG. 5 for the second preferred embodiment of the present invention. The connection device 5 further includes a main housing H in which the high-speed storage unit 54, the memory unit 56, and the control module 58 are packaged. The first connection module 51 and the second connection module 52 are connected to the main housing H from outside and are respectively and electrically connected to the control module 58 through transmission lines L (e.g., wires or optical fibers).

Figure 5:
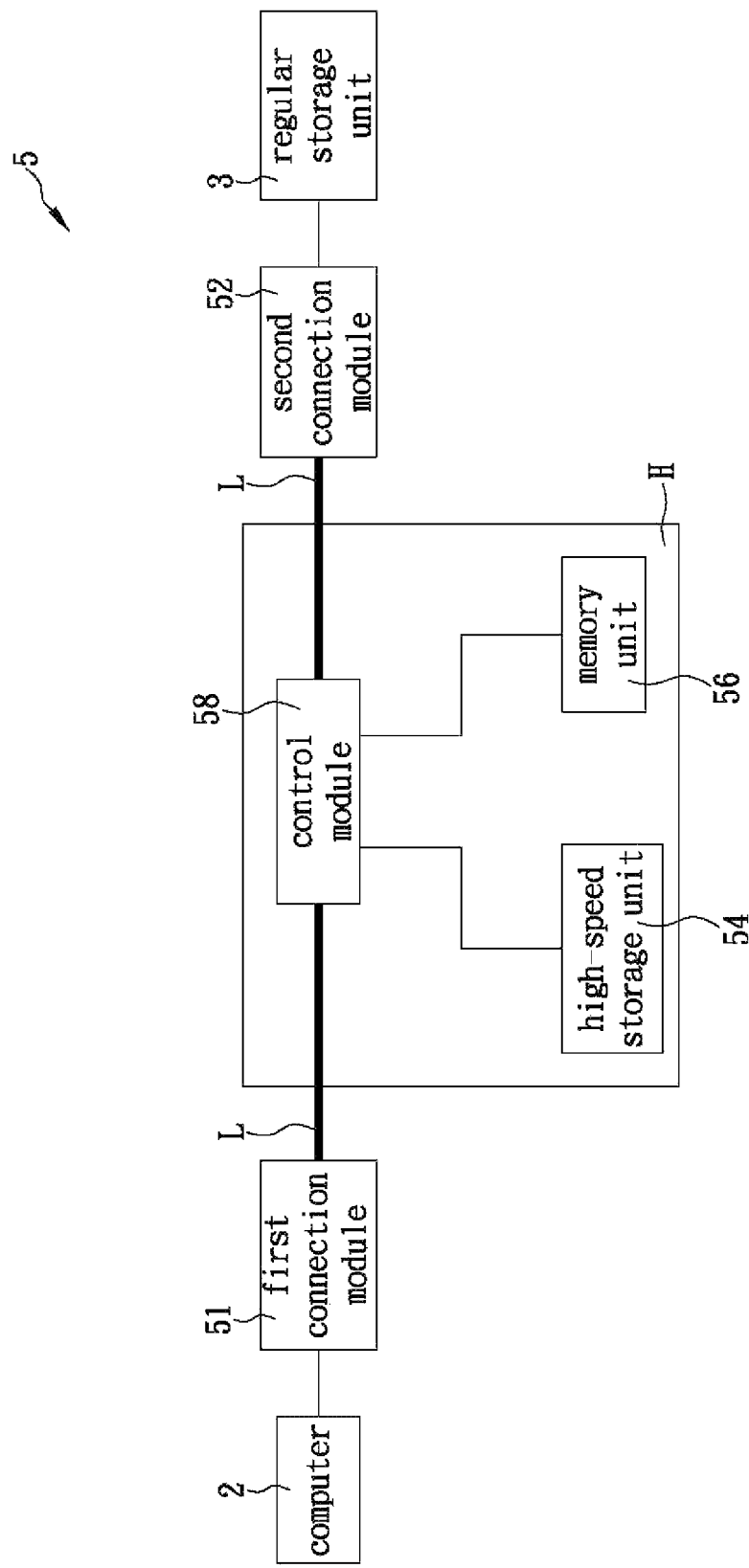
FIG. 5 is a schematic drawing of the second preferred embodiment of the connection device of the present invention.
Figure 6:
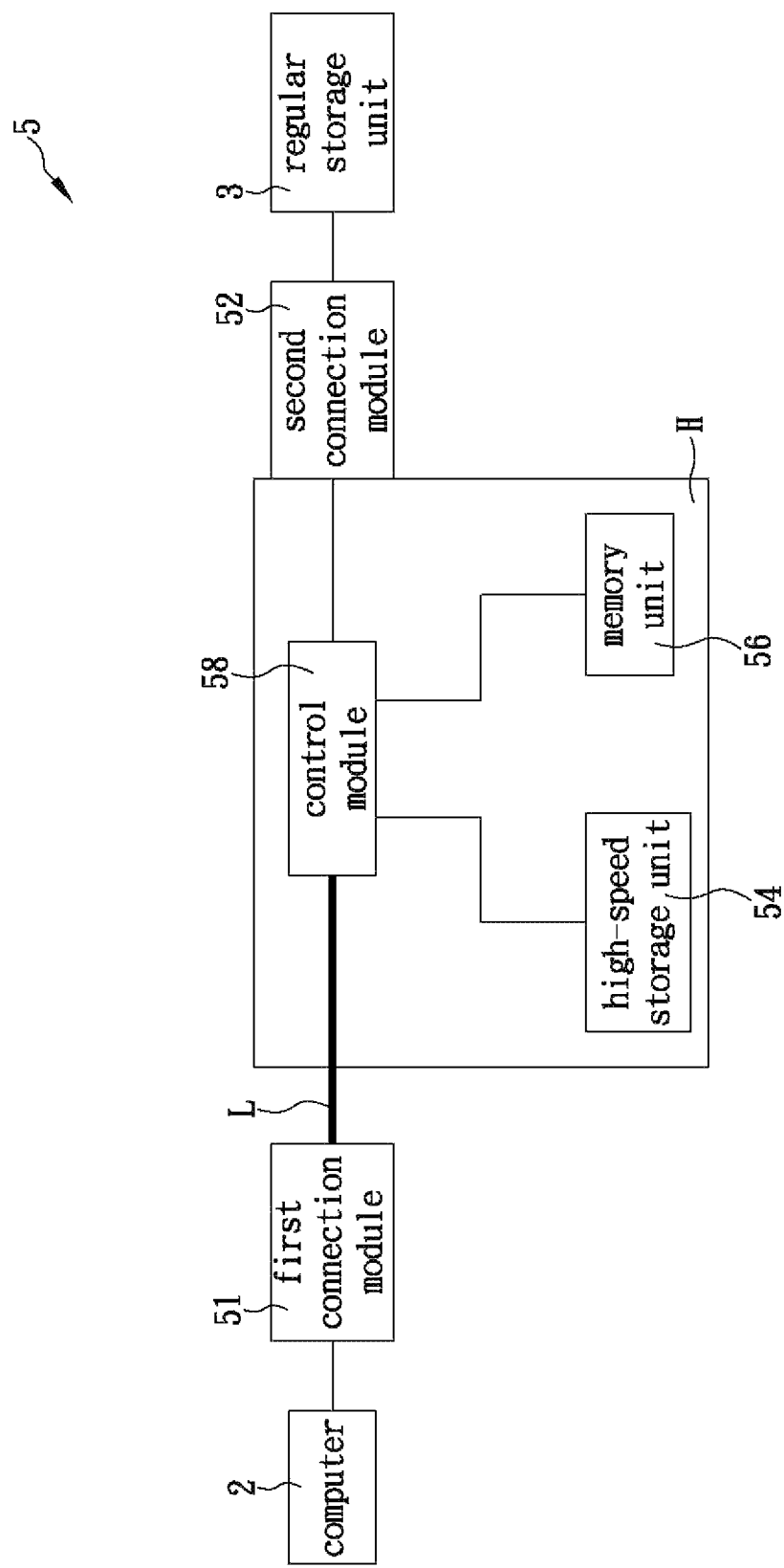
FIG. 6 is a schematic drawing of the third preferred embodiment of the connection device of the present invention.

FIG. 6 shows the third preferred embodiment of the present invention. For the sake of clarity, all the elements in FIGS. 6~10 that are identical to their counterparts in FIG. 5 are identified by the same reference numerals. In this embodiment, the high-speed storage unit 54, the memory unit 56, and the control module 58 are also packaged in the main housing H. The first connection module 51 is electrically connected to the control module 58 via the transmission line L. The second connection module 52, which supports to one type of connection interface specifications (e.g., IDE, SCSI, SATA or like interface), is directly fixedly provided on the main housing H to facilitate connection between the second connection module 52 and the regular storage unit 3, which supports the same type interface specification, too.

Figure 7:
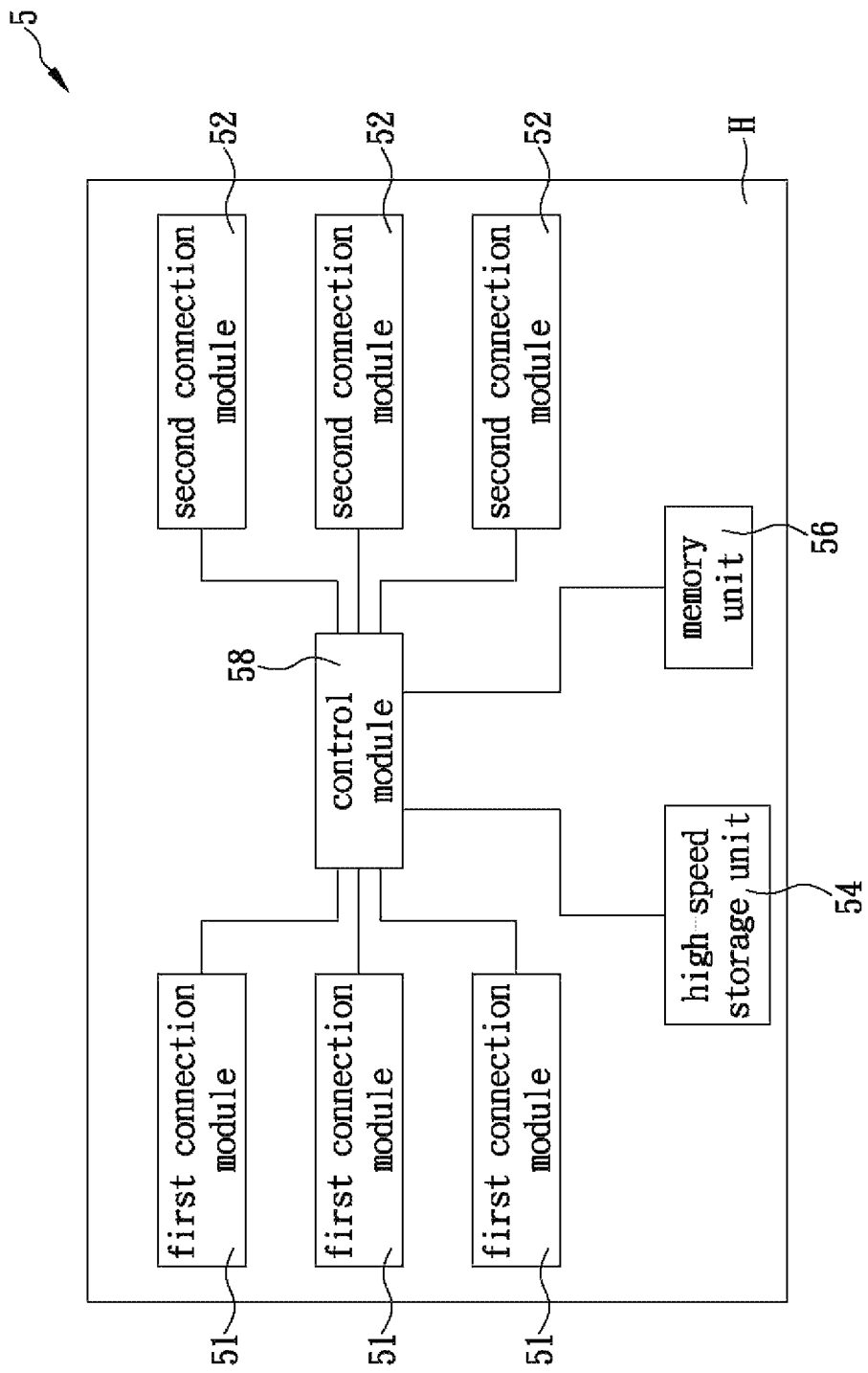
FIG. 7 is a schematic drawing of the fourth preferred embodiment of the connection device of the present invention.

In the fourth preferred embodiment of the present invention as shown in FIG. 7, the connection device 5 is provided with a plurality of first connection modules 51 and a plurality of second connection modules 52. The specifications of each first connection module 51 and of each second connection module 52 correspond to one type of connection interface (e.g., IDE, SCSI, SATA, IEEE 1394, USB, and Thunderbolt), so a user may connect computers and regular storage units of different specifications to the corresponding connection modules 51, 52.

Figure 8:
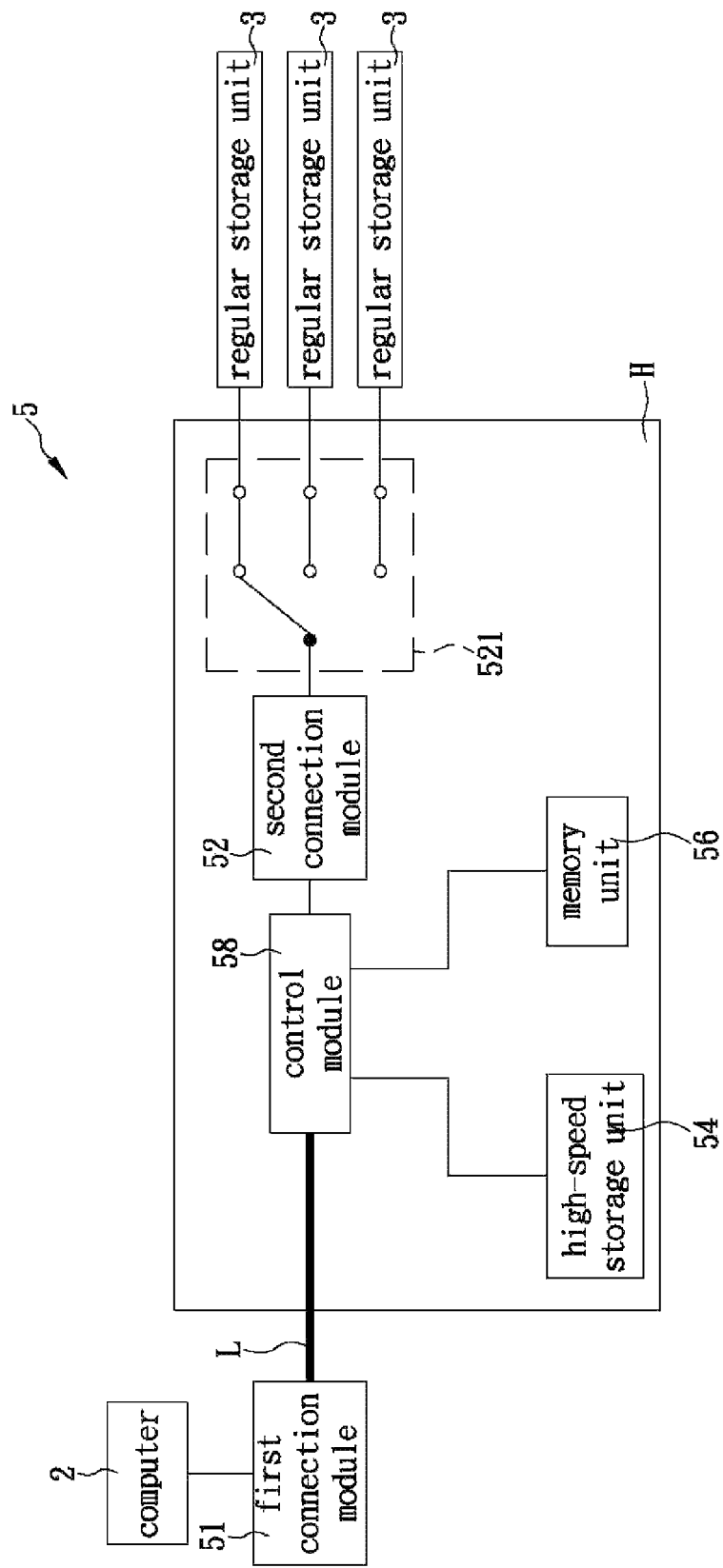
FIG. 8 is a schematic drawing of the fifth preferred embodiment of the connection device of the present invention.

In the fifth preferred embodiment of the present invention as shown in FIG. 8, the second connection module 52 is further provided with a first switch 521. Where there are a plurality of regular storage units 3, the first switch 521 provides selective electrical connection with any one of the regular storage units 3. Thus, by means of the first switch 521, a user can conveniently select the regular storage unit 3 with which the computer 2 is to connect, so as for the high-speed storage unit 54 to accelerate the data reading or writing operation performed on this regular storage unit 3.

Figure 9:
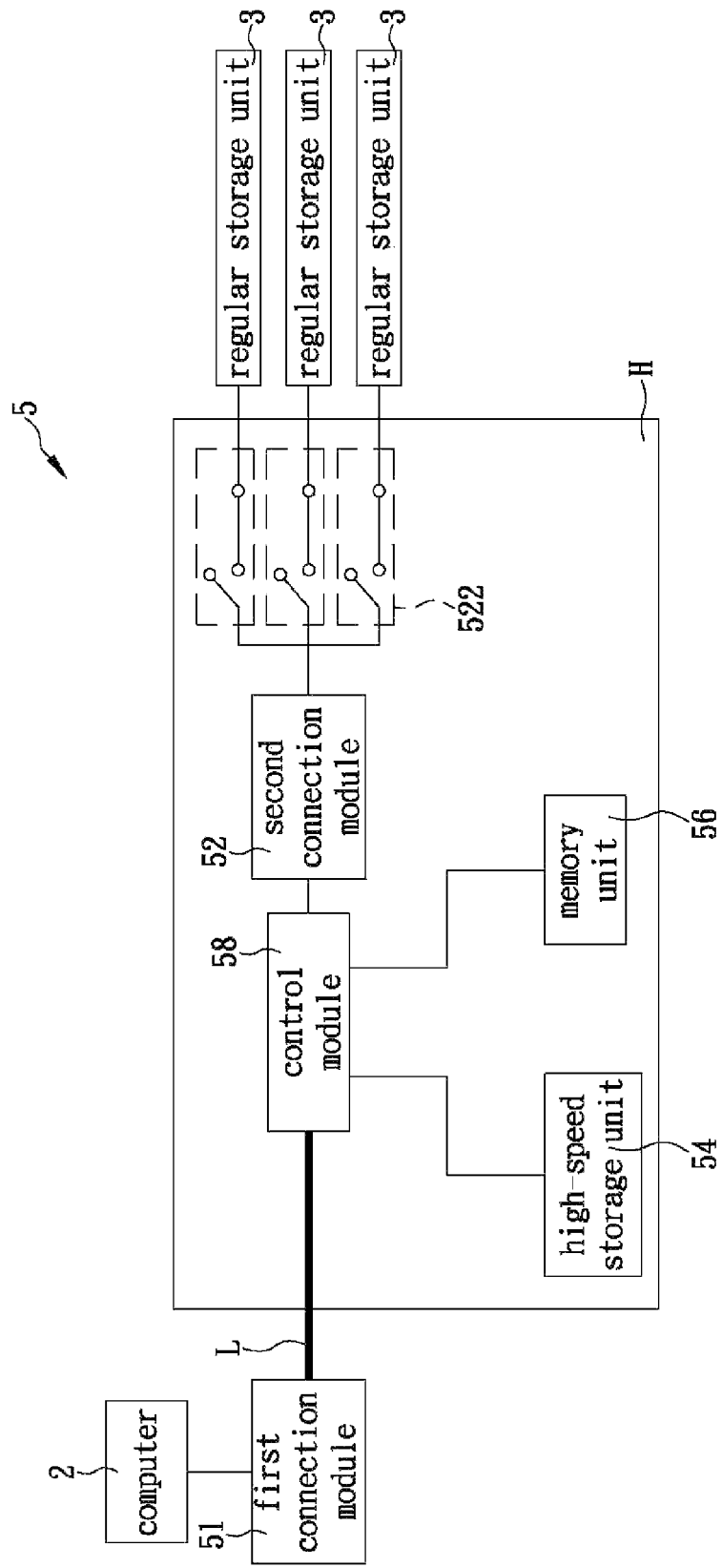
FIG. 9 is a schematic drawing of the sixth preferred embodiment of the connection device of the present invention.
Figure 10:
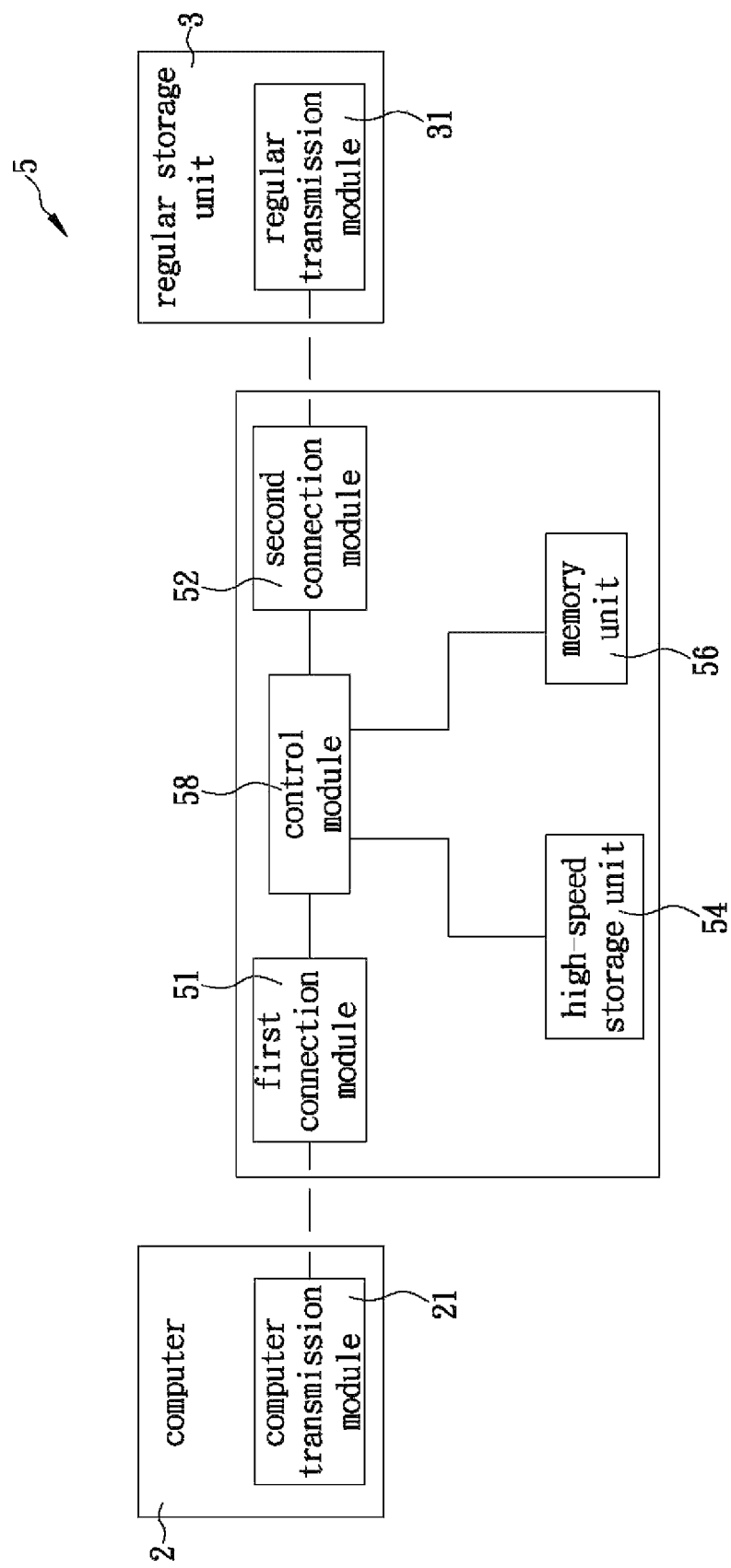
FIG. 10 is a schematic drawing of the seventh preferred embodiment of the connection device of the present invention.

Referring to FIG. 9 for the sixth preferred embodiment of the present invention, the second connection module 52 is provided with a plurality of second switches 522, each electrically connected to one regular storage unit 3. By controlling the connection and disconnection between each second switch 522 and the corresponding regular storage unit 3, the number of the regular storage units 3 connected to the connection device 5 can be adjusted, so as for the connection device 5 to speed up several regular storage units 3 at the same time. During data transmission between the connection device 5 and plural regular storage units 3, the operation of the control module 58 is the same as shown in FIGS. 2A~4C, except that the control module 58 creates a forward mapping table for each regular storage unit 3 and can write a forward tag into each forward field of each forward mapping table such that each forward field corresponds to one high-speed storage section. When the computer 2 is to perform a reading or writing operation on the regular storage units 3, the control module 58 still follows the aforesaid processing procedure; that is to say, the control module 58 will perform the reading or writing operation preferentially on the high-speed storage unit 54 according to the forward mapping tables and the backward mapping table stored in the memory unit 56.

It should be pointed out that, while the first connection module 51 and the second connection module 52 in FIGS. 5~9 are both connection ports, the connection device 5 is not limited to such a design. Whether the connection modules 51, 52 are directly fixedly provided on the main housing H or are connected to the main housing H through the transmission lines L may be adjusted according to the interface(s) used and product requirements. The main technical feature of the connection device 5 of the present invention is that the connection device 5 can connect to the computer 2 and the regular storage unit 3 with ease and can, by virtue of the high-speed storage unit 54 and the control module 58, shorten the time required for data processing. In addition, referring to FIG. 10 for the seventh preferred embodiment of the present invention, both the first connection module 51 and the second connection module 52 are wireless transmission units. Therefore, when the computer 2 and the regular storage unit 3 are respectively provided with a computer transmission module 21 and a regular transmission module 31, the first connection module 51 and the second connection module 52 can transmit data to the computer transmission module 21 and the regular transmission module 31 in a wireless manner (e.g., via Bluetooth, Wi-Fi, etc.) respectively.

While the invention herein disclosed has been described by means of specific embodiments, numerous modifications and variations could be made thereto by those skilled in the art without departing from the scope of the invention set forth in the claims.

What is claimed is:

1. A connection device capable of increasing data reading and writing speeds, comprising:
   a first connection module having an end connected to a computer;
   a second connection module having an end connected to at least one regular storage unit, each said regular storage unit having a plurality of regular storage sections;
   a high-speed storage unit having a plurality of high-speed storage sections and having a higher data reading speed and a higher data writing speed than each said regular storage unit; and
   a control module respectively and electrically connected to the first connection module, the second connection module, and the high-speed storage unit, the control module being configured for identifying each said regular storage unit and the high-speed storage unit and generating a forward mapping table for each said regular storage unit and a backward mapping table for the high-speed storage unit; and
   a memory unit being electrically connected to the control module and configured for storing the at least one forward mapping table and the backward mapping table;
   wherein each said forward mapping table has a plurality of forward fields, each said forward field corresponds to a said regular storage section, the backward mapping table has a plurality of backward fields, and each said backward field corresponds to a said high-speed storage section; and wherein each said forward field can correspond to a said backward field through a forward tag, and each said backward field can correspond to a said forward field through a backward tag, so as to enable the control module to perform a reading or writing operation in response to the computer on the high-speed storage unit first and update and confirm the corresponding data in the regular storage unit when the computer is in idle according to the forward tag and backward tag.

2. The connection device of claim 1, wherein the end of the first connection module is connected to the computer in a wired manner, and the end of the second connection module is connected to the at least one regular storage unit in a wireless manner.

3. The connection device of claim 1, wherein the end of the first connection module is connected to the computer in a wireless manner, and the end of the second connection module is connected to the at least one regular storage unit in a wired manner.

4. The connection device of claim 1, wherein each of the first connection module and the second connection module is a connection port such that the first connection module and the second connection module transmit data to and from the computer and the at least one regular storage unit in a wired manner respectively.

5. The connection device of claim 1, wherein each of the first connection module and the second connection module is a wireless transmission unit such that the first connection module and the second transmission module transmit data to and from the computer and the at least one regular storage unit in a wireless manner respectively.

6. The connection device of claim 2, wherein the second connection module is provided with a first switch such that, when there are a plurality of said regular storage units, the first switch provides selective electrical connection with a said regular storage unit to enable data transmission between the connection device and the regular storage unit.

7. The connection device of claim 3, wherein the second connection module is provided with a first switch such that, when there are a plurality of said regular storage units, the first switch provides selective electrical connection with a said regular storage unit to enable data transmission between the connection device and the regular storage unit.

8. The connection device of claim 4, wherein the second connection module is provided with a first switch such that, when there are a plurality of said regular storage units, the first switch provides selective electrical connection with a said regular storage unit to enable data transmission between the connection device and the regular storage unit.

9. The connection device of claim 5, wherein the second connection module is provided with a first switch such that, when there are a plurality of said regular storage units, the first switch provides selective electrical connection with a said regular storage unit to enable data transmission between the connection device and the regular storage unit.

10. The connection device of claim 2, further comprising a third connection module, the third connection module having an end electrically connected to the control module and an opposite end connectable to an external power supply unit, so as for the power supply unit to supply power to the control module through the third connection module.

11. The connection device of claim 3, further comprising a third connection module, the third connection module having an end electrically connected to the control module and an opposite end connectable to an external power supply unit, so as for the power supply unit to supply power to the control module through the third connection module.

12. The connection device of claim 4, further comprising a third connection module, the third connection module having an end electrically connected to the control module and an opposite end connectable to an external power supply unit, so as for the power supply unit to supply power to the control module through the third connection module.

13. The connection device of claim 5, further comprising a third connection module, the third connection module having an end electrically connected to the control module and an opposite end connectable to an external power supply unit, so as for the power supply unit to supply power to the control module through the third connection module.

* * * * *